(12) United States Patent
Greifeneder

(10) Patent No.: US 8,464,225 B2
(45) Date of Patent: Jun. 11, 2013

(54) METHOD AND SYSTEM FOR ADAPTIVE, GENERIC CODE INSTRUMENTATION USING RUN-TIME OR LOAD-TIME GENERATED INHERITANCE INFORMATION FOR DIAGNOSIS AND MONITORING APPLICATION PERFORMANCE AND FAILURE

(75) Inventor: Bernd Greifeneder, Linz (AT)

(73) Assignee: dynaTrace software GmbH (AT)

( * ) Notice: Subject to any disclaimer, the term of this patent is extended or adjusted under 35 U.S.C. 154(b) by 1774 days.

(21) Appl. No.: 11/744,876

(22) Filed: May 6, 2007

(65) Prior Publication Data

US 2008/0276227 A1    Nov. 6, 2008

(51) Int. Cl.
  *G06F 9/44*    (2006.01)
  *G06F 9/45*    (2006.01)

(52) U.S. Cl.
  USPC ......................................... 717/130; 717/158

(58) Field of Classification Search
  USPC .................................. 717/130, 158
  See application file for complete search history.

(56) References Cited

U.S. PATENT DOCUMENTS

| | | |
|---|---|---|
| 5,432,932 A | 7/1995 | Chen |
| 5,727,147 A | 3/1998 | vanHoff |
| 5,781,778 A | 7/1998 | Meier |
| 5,794,046 A | 8/1998 | Meier |
| 5,867,712 A | 2/1999 | Shaw |
| 5,933,639 A | 8/1999 | Meier |
| 5,953,530 A | 9/1999 | Rishi |
| 6,101,524 A | 8/2000 | Choi |
| 6,102,966 A * | 8/2000 | Tyma .......................... 717/110 |
| 6,134,603 A | 10/2000 | Jones |
| 6,145,121 A | 11/2000 | Levy |
| 6,151,639 A | 11/2000 | Tucker |
| 6,202,199 B1 | 3/2001 | Wygodny |
| 6,266,805 B1 | 7/2001 | Nwana |
| 6,332,212 B1 | 12/2001 | Organ |
| 6,539,541 B1 | 3/2003 | Geva |
| 6,721,941 B1 | 4/2004 | Morshed |
| 6,754,890 B1 | 6/2004 | Berry |
| 6,760,903 B1 | 7/2004 | Morshed |
| 6,795,962 B1 | 9/2004 | Hanson |
| 6,862,711 B1 | 3/2005 | Bahrs |
| 6,961,926 B2 | 11/2005 | Koyama |

(Continued)

OTHER PUBLICATIONS

Web article (Metadata API Overview, dated May 27, 2006, URL: http://msdn.microsoft.com/en-us/library/ms404434).*

(Continued)

*Primary Examiner* — Li B Zhen
*Assistant Examiner* — Hang Pan
(74) *Attorney, Agent, or Firm* — Robert Plotkin, P.C.

(57) ABSTRACT

A system for generic, run-time adaptive placement of byte code instrumentation takes into account object oriented inheritance relationships that are stored in an inheritance repository. The inheritance repository, which mirrors the structure of the monitored application, is created at run-time and is updated if the code base of the monitored application changes either dynamically at run-time or by manually changing the configuration and restarting the application. The inheritance repository contains meta-data of application classes and their relationships, like direct and indirect inheritance. The inheritance repository information is used to evaluate generic instrumentation placement rules, like rules that match to methods of classes that inherit from a specific base class. The inheritance repository is generated concurrently with instrumentation placement at application load-time or run-time and persists between application runs to enable dedicated adaptation runs to create the repository.

26 Claims, 9 Drawing Sheets

U.S. PATENT DOCUMENTS

| | | | |
|---|---|---|---|
| 6,968,540 B2 * | 11/2005 | Beck et al. | 717/130 |
| 6,978,444 B1 | 12/2005 | Farchi | |
| 7,143,392 B2 | 11/2006 | Li | |
| 7,162,710 B1 | 1/2007 | Edwards | |
| 7,263,689 B1 | 8/2007 | Edwards | |
| 7,293,259 B1 | 11/2007 | Dmitriev | |
| 7,293,260 B1 | 11/2007 | Dmitriev | |
| 7,367,025 B2 | 4/2008 | Nikolov | |
| 7,376,940 B1 | 5/2008 | Bush | |
| 7,380,239 B1 | 5/2008 | Srivastava | |
| 7,409,676 B2 | 8/2008 | Agarwal | |
| 7,493,607 B2 | 2/2009 | Moritz | |
| 7,496,903 B2 | 2/2009 | Rees | |
| 7,500,227 B1 | 3/2009 | Fontana | |
| 7,526,760 B1 | 4/2009 | Daynes | |
| 7,685,183 B2 | 3/2010 | Pace | |
| 7,818,721 B2 | 10/2010 | Sundararajan | |
| 7,950,004 B2 | 5/2011 | Vieira | |
| 7,957,934 B2 | 6/2011 | Greifeneder | |
| 7,992,133 B1 | 8/2011 | Theroux | |
| 7,992,134 B2 | 8/2011 | Hinchey | |
| 8,032,872 B2 | 10/2011 | Violleau | |
| 8,037,458 B2 | 10/2011 | Shekov | |
| 2001/0004766 A1 | 6/2001 | Koyama | |
| 2002/0032754 A1 | 3/2002 | Logston | |
| 2002/0174415 A1 | 11/2002 | Hines | |
| 2002/0199173 A1 | 12/2002 | Bowen | |
| 2003/0056200 A1 | 3/2003 | Li | |
| 2004/0010570 A1 | 1/2004 | Kaler | |
| 2004/0093588 A1 | 5/2004 | Gschwind | |
| 2005/0039171 A1 | 2/2005 | Avakian | |
| 2005/0039172 A1 | 2/2005 | Rees | |
| 2005/0039186 A1 | 2/2005 | Borkan | |
| 2005/0039187 A1 | 2/2005 | Avakian | |
| 2005/0039190 A1 | 2/2005 | Rees | |
| 2005/0086656 A1 * | 4/2005 | Whitlock et al. | 718/1 |
| 2005/0223367 A1 | 10/2005 | Smith | |
| 2005/0278706 A1 | 12/2005 | Garza | |
| 2005/0283522 A1 | 12/2005 | Parkkinen | |
| 2006/0069682 A1 | 3/2006 | Fanous | |
| 2006/0271395 A1 | 11/2006 | Harris | |
| 2006/0271542 A1 | 11/2006 | Harris | |
| 2006/0271575 A1 | 11/2006 | Harris | |
| 2006/0271930 A1 | 11/2006 | Letizi | |
| 2006/0271931 A1 | 11/2006 | Harris | |
| 2007/0011667 A1 | 1/2007 | Subbiah | |
| 2007/0069005 A1 | 3/2007 | Dickerson | |
| 2007/0088762 A1 | 4/2007 | Harris | |
| 2007/0143323 A1 | 6/2007 | Vanrenen | |
| 2007/0143743 A1 | 6/2007 | Cobb | |
| 2007/0169055 A1 | 7/2007 | Greifeneder | |
| 2007/0180439 A1 | 8/2007 | Sundararajan | |
| 2008/0276227 A1 | 11/2008 | Greifeneder | |
| 2008/0288212 A1 | 11/2008 | Greifeneder | |
| 2008/0288962 A1 | 11/2008 | Greifeneder | |
| 2009/0049429 A1 | 2/2009 | Greifeneder | |

OTHER PUBLICATIONS

Mikhail Dmitriev, "Design of JFluid: A Profiling Technology and Tool Based on Dynamic Bytecode Instrumentation," Sun Microsystems, 2003, <http://delivery.acm.org/10.1145/1700000/1698171/smli_tr-2003-125.pdf> pp. 1-22.

Mikhail Dmitriev, "Selective Profiling of Java Applications Using Dynamic Bytecode Instrumentation," IEEE, 2004, <http://ieeexplore.ieee.org/stamp/stamp.jsp? tp=&arnumber=1291366> pp. 141-151.

Parker Abercrombie et al., "jContractor: Bytecode Instrumentation Techniques for Implementing Design by Contract in Java," UCSB, Aug. 2004, <http://jcontractor.sourceforge.net/doc/jContractor_RV02.pdf> pp. 1-25.

Kuang et al., "E AHRW: An energy efficient adaptive hash scheduler for stream processing on multicore servers," IEEE, pp. 45-56, 2011.

Prabhu et al, "Using thread level speculation to simplify manual parallelization," ACM PPoPP, pp. 1-12, 2003.

Ntarmos et al, "Distributed hash sketches: scalable efficient and accurate cardinality estimation for distributed multisets," ACM Trans. on Comput. Sys. vol. 27, No. 1, article 2, pp. 1-52, 2009.

Olivier et al, "Scheduling task parallelism on multi socket multicore systems", ACM ROSS, pp. 49-56, 2011.

Andrew Z. Tabona, Windows 2003 performance monitor, p. 1-8, Publish Mar. 29, 2004.

* cited by examiner

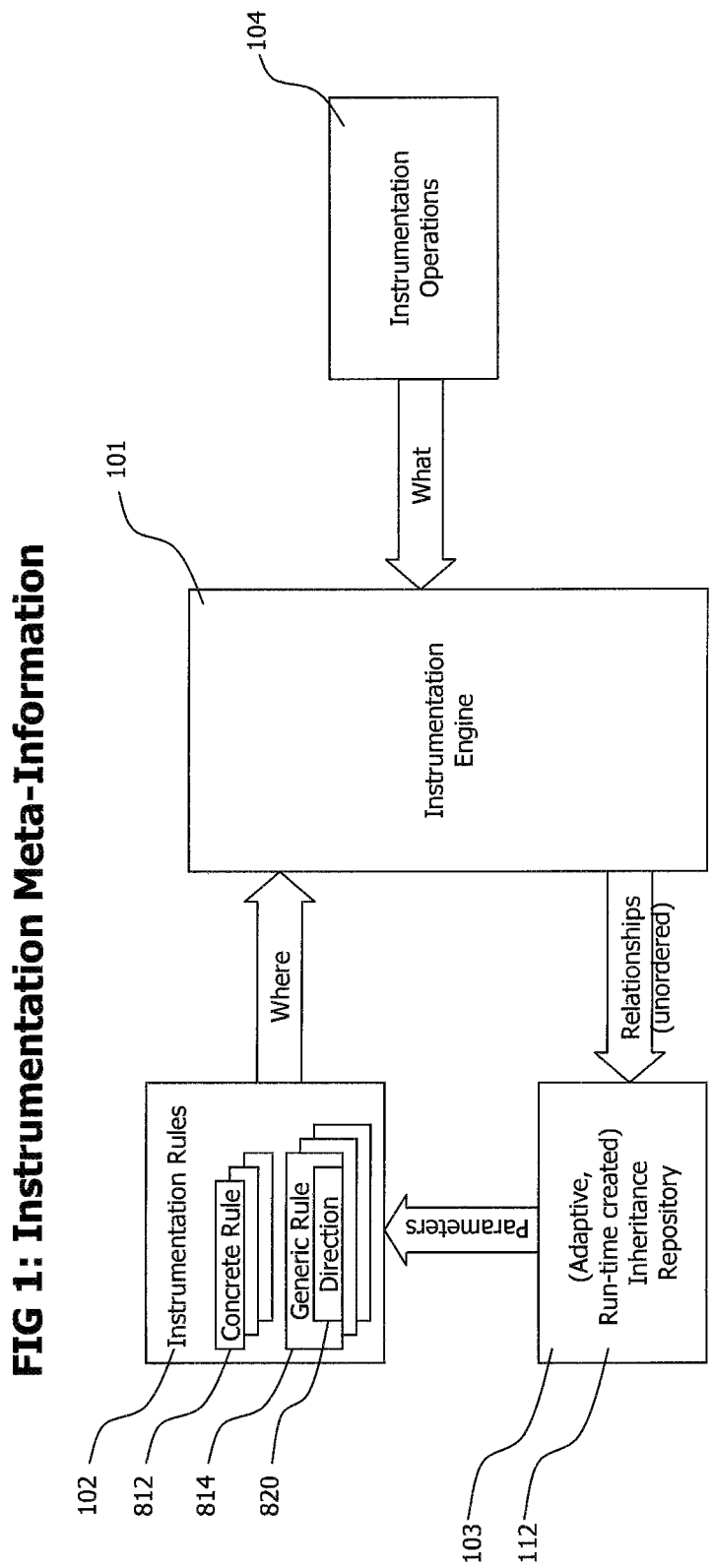
FIG 1: Instrumentation Meta-Information

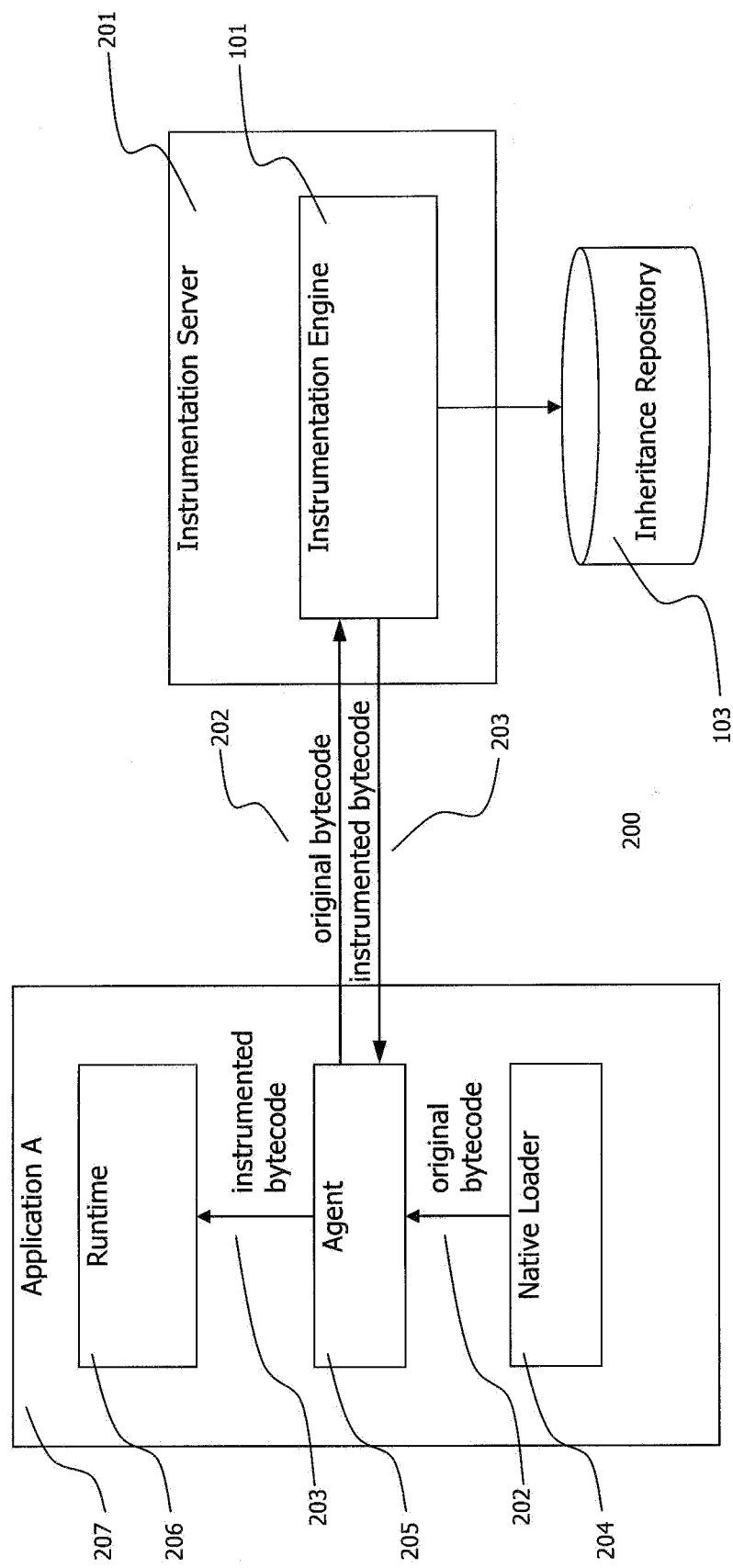
FIG 2: Run-time/Load-time Instrumentation

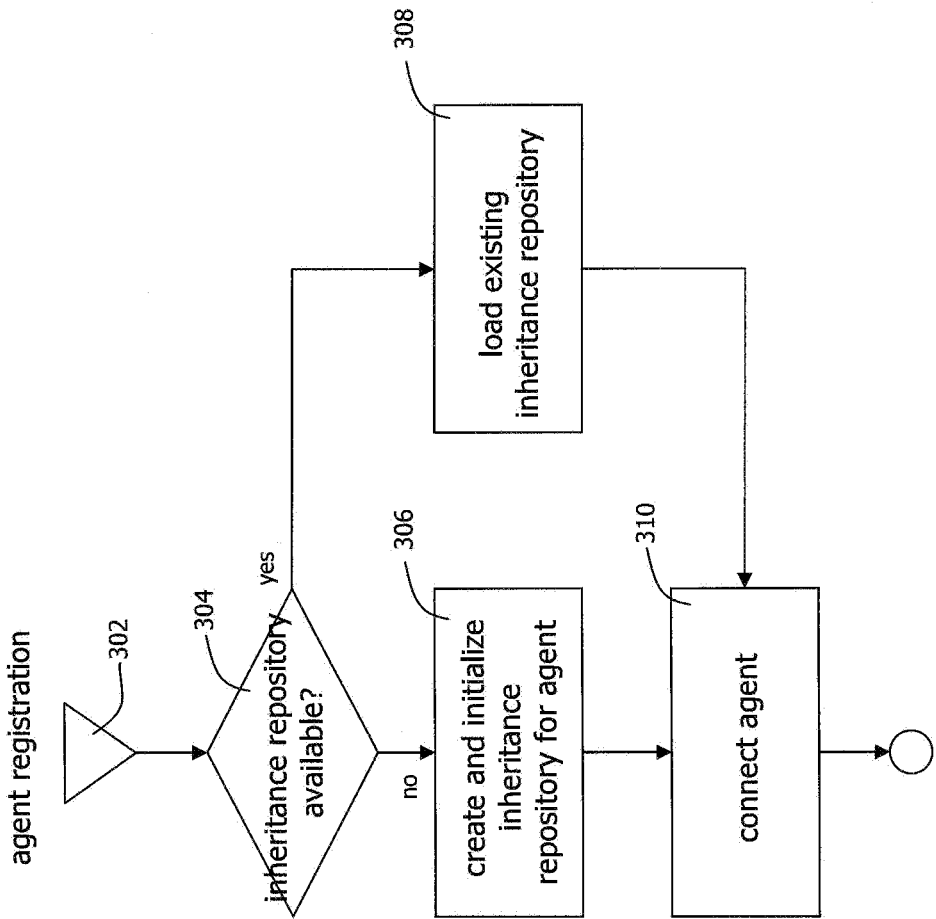
FIG 3: Initialize Inheritance Repository

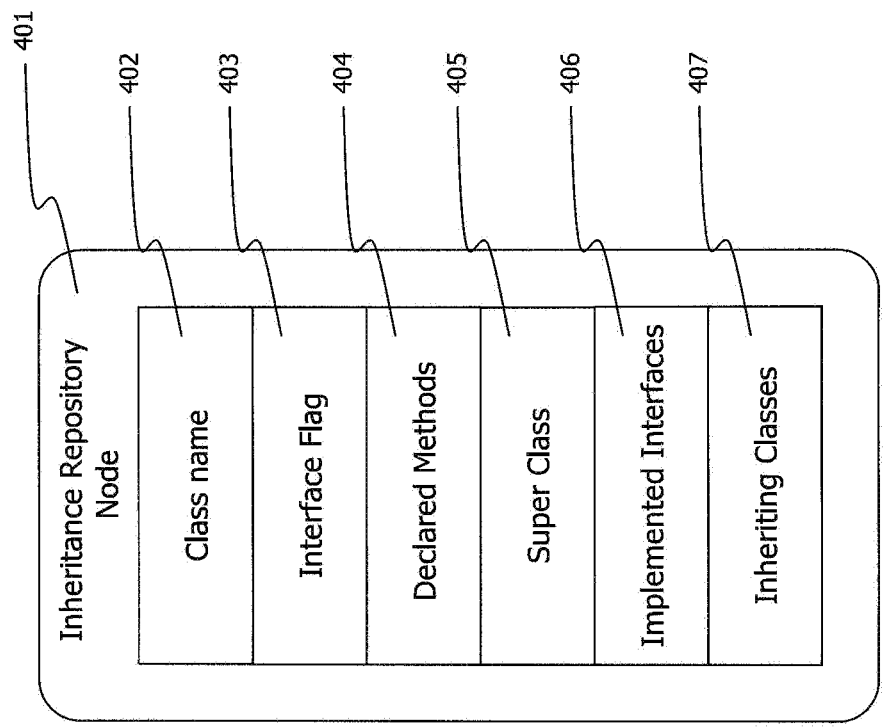
FIG 4: Inheritance Repository Node (IRN)

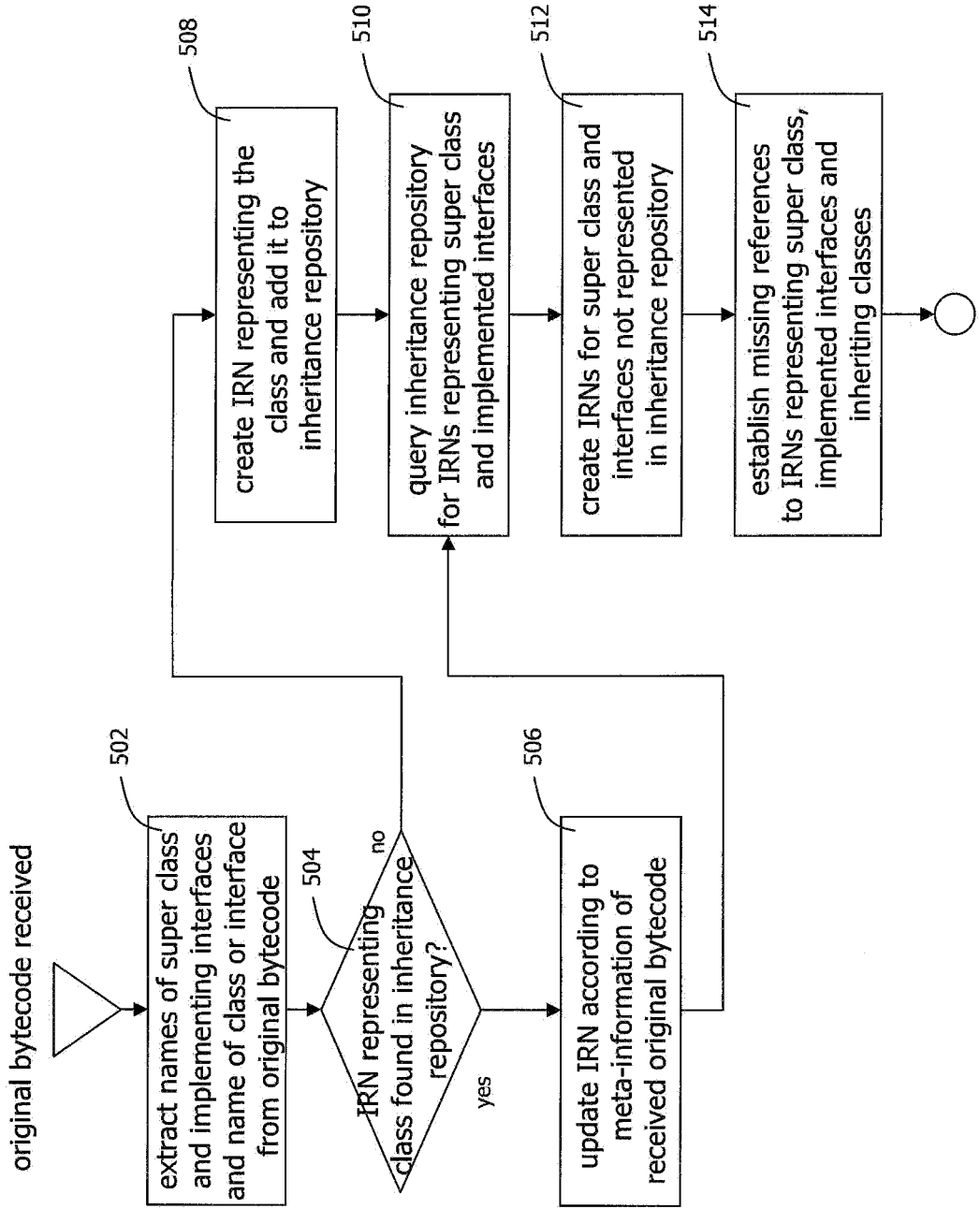

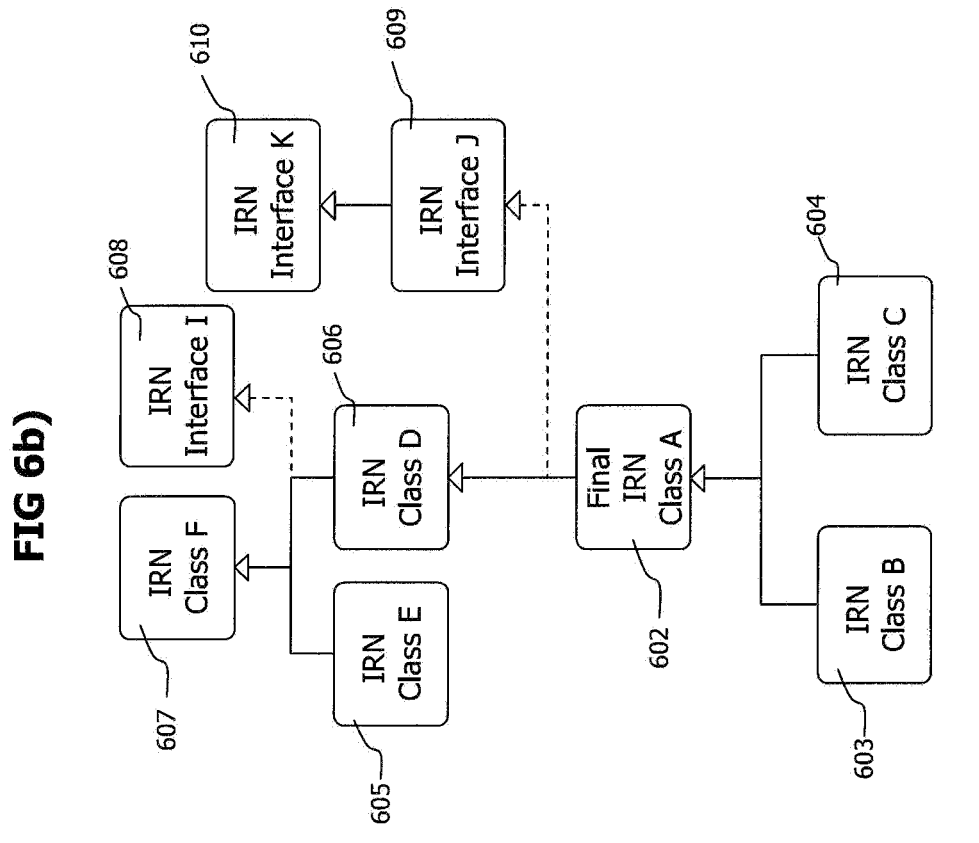
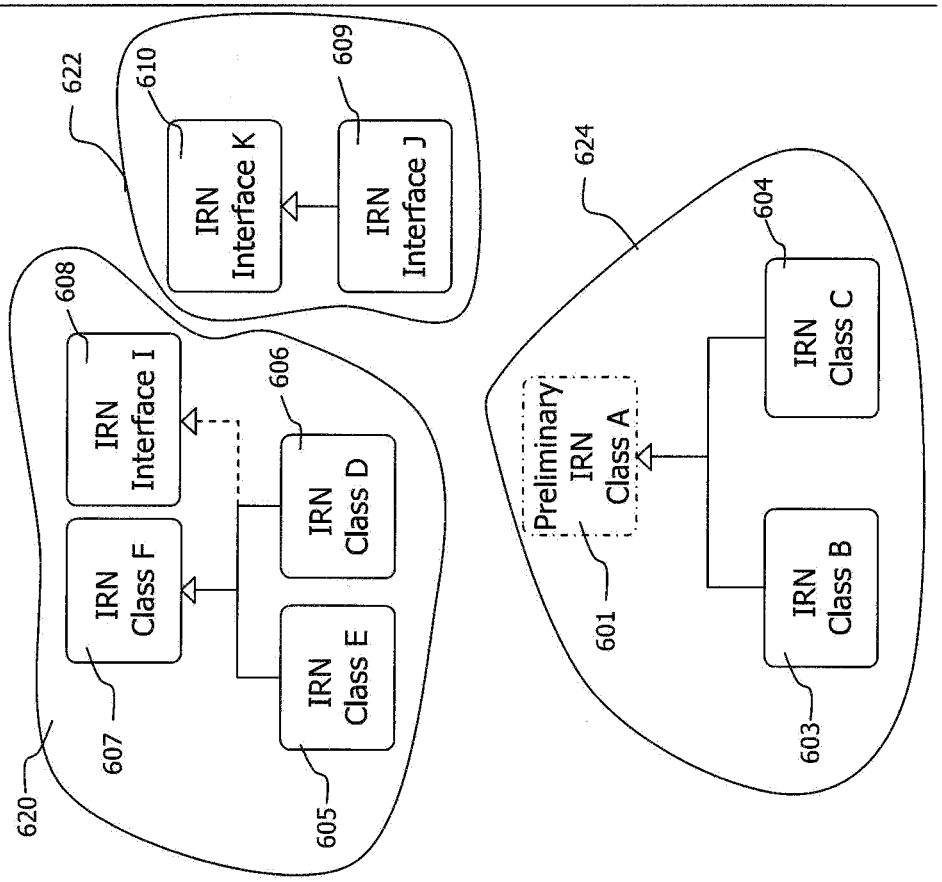
FIG 6: Exemplary Inheritance Repository

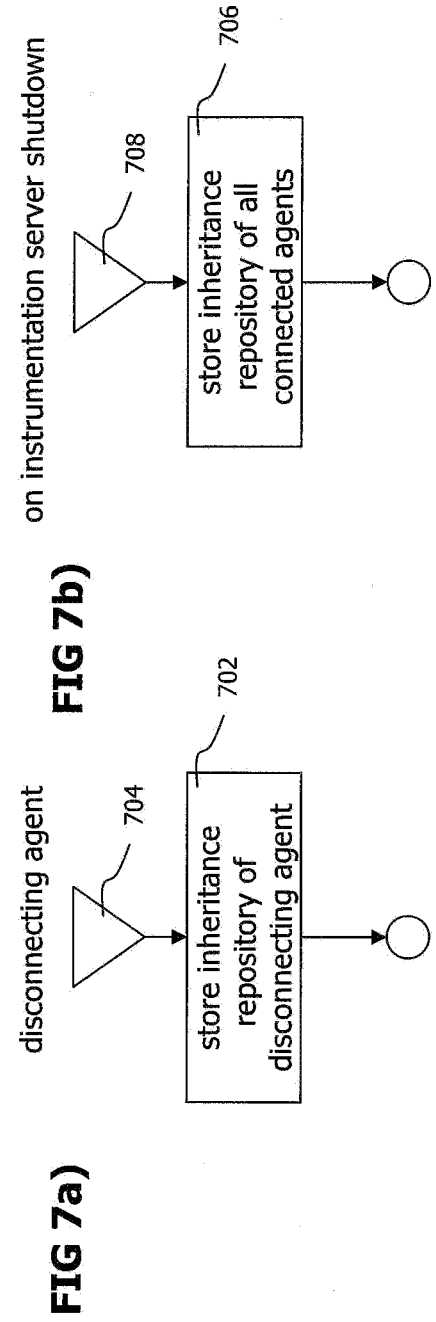

FIG 8: Evaluation of Instrumentation Rules

| Type | | concrete | downward | generic | upward |
|---|---|---|---|---|---|
| | Direction | | | | |
| Sample class diagram | | Z / +M1() | <<interface>> A / +M1()  ;  B / +M2()  ;  Z / +M1() +M2() | | Z / +M1()  ◁  X |
| Filter criteria | | Z.M1 or Z.* | A.M1 or A.*, B.M2 or B.* | | X.M1 or X.* |
| Instrumented method | | Z.M1 | Z.M1 and Z.M2 | | Z.M1 |
| Description | | Method M1 of Class Z is specified explicitly. | Method M1 of class Z is specified by the implemented interface A. Method M2 of class Z is specified by its super class B. | | Method M1 of class Z is specified by the inheriting class X. |

820 — 801 — 802 — 812 — 814 — 816 — 803 — 818

FIG 9: Place Instrumentation in Original Bytecode

METHOD AND SYSTEM FOR ADAPTIVE, GENERIC CODE INSTRUMENTATION USING RUN-TIME OR LOAD-TIME GENERATED INHERITANCE INFORMATION FOR DIAGNOSIS AND MONITORING APPLICATION PERFORMANCE AND FAILURE

FIELD OF THE INVENTION

The present invention is directed to a system for adaptive and generic bytecode instrumentation for performance monitoring and failure diagnosis tools using load-time or run-time bytecode instrumentation. The placement of instrumentation code is determined at load-time or run-time, taking object-oriented inheritance relationships into account.

BACKGROUND OF THE INVENTION

The increasing number of features demanded from successful applications and getting shorter development cycles increase complexity of applications and dependency on $3^{rd}$ party components and libraries.

Further, new programming approaches like aspect oriented programming (AOP), which helps mastering source code complexity and thus increase productivity of software development, increase the run-time complexity of applications by adding or altering classes or methods of the application during run-time.

Bytecode instrumentation based monitoring and diagnosis systems must provide adaptive, flexible instrumentation placement tools to enable comfortable application monitoring in such complex and dynamic environments.

Such instrumentation placement tools must enable instrumentation placement and modification at class load-time or during run-time. Run-time changes of the application code base or $3^{rd}$ party libraries and components must be managed by the placement tool, e.g. by adding new instrumentation code on-the-fly. The instrumentation tool must cope with different class loading mechanisms, including classes loading from network resources.

Further, generic instrumentation placement is required, enabling the instrumentation of top-level component interfaces like e.g. the JDBC driver interfaces, regardless of the concrete implementation of the component. The placement tool should be able to instrument any bytecode based application, regardless of the application type (e.g. J2EE, stand-alone or applet) or underlying bytecode based system (e.g. Sun Microsystems's Java or Microsoft's .NET).

Finally, an instrumentation placement tool must not interfere with behavior or functionality of the application by e.g. changing the class load order.

DESCRIPTION OF RELATED ART

There are several approaches to filter positions for code instrumentations. One approach, as described in [1] and [2], is to specify methods that are target for instrumentation by explicitly specifying the class that contains the method and the method itself. This approach enables basic run-time adaptable instrumentation if instrumentation code is placed near to run-time, e.g. at class loading time, but it lacks information about the internal inheritance structure of the application. To select classes and methods for instrumentation, a user requires in-depth knowledge of the internal structure of the application and used $3^{rd}$ party components and libraries, including names of classes and methods. In most cases, information at this fine grained level is difficult to acquire for an application and not available for $3^{rd}$ party components. The Test and Performance Tools Platform (TPTP), a plug-in to the well-known Eclipse development environment, applies this approach and enhances it by enabling the usage of search patterns for the specification of classes and methods. Although search patterns ease the placement of instrumentations because exact knowledge of classes and methods is no longer required, still in-depth knowledge of the application structure is required due to missing information about the internal inheritance structure of the application.

An enhanced version of this approach, as described in [3], uses additional meta-data that is available at load-time of class bytecode, like the direct base class or direct implemented interfaces of the loaded class. The meta-data is used to identify methods that should be instrumented, enabling filter criteria taking direct base class or direct implemented interfaces into account. Although this approach enables more generic method filtering, due to the restriction to direct relationships between classes and interfaces, it also lacks information about global inheritance relationships and thus still requires in-depth knowledge of the internal structure of the monitored application.

AOP based approaches employing a load-time aspect weaver, which enables altering class bytecode during class loading, use meta-data extracted from bytecode to identify classes and methods. But due to the restricted structural information available at load-time, this approach is also limited to the direct neighborhood of the loaded class, like the direct base class or directly implemented interfaces of the loaded class.

Other approaches analyze application deployment data and partially decompile application code to acquire structural information about the application. The system and method presented in [4] uses this approach. The gathered structural information may be used for instrumentation placement. This technique provides fine grained insight into the internal inheritance, but due to the analyzing step which has to be performed prior to run-time, it lacks adaptability to run-time altered application bytecode. Further, every change of the inheritance structure requires a new analysis and decompilation run.

Consequently, a need for an alternative approach exists that overcomes the shortcomings of the present approaches.

APPENDIX

Referenced Patents

[1] Berry R. F. and Hussain R. Y.; "System and Method for Dynamic Modification of Class Files"; International Business Machines Corporation; US006026234A

[2] Cohen G. A. and King R. A.; "Apparatus and Method for Dynamically Modifying Class Files during Loading for Execution"; International Business Machines Corporation; US006026237A

[3] Boykin J. R., Giammaria A., Schlosser B. J. and Tapperson K. G.; "Method and System for Auto-Instrumenting Java Applications Through Probe Injection"; 20040123279A1

[4] Fenion M. G., Markis A. P. and LaFrance P. J.; "Method and System for Monitoring Distributed Systems"; Diring Software; 20040039728A1

SUMMARY OF THE INVENTION

The present invention is dedicated to a system and method for adaptive, generic bytecode instrumentation for performance monitoring and failure diagnosis tools using load-time or run-time bytecode instrumentation. Information concerning object-oriented inheritance structures is used to determine methods that are target for instrumentation. A mapping of said inheritance structures is stored in an inheritance repository.

The present invention requires neither source code modifications of monitored source code nor access to the source code to instrument bytecode based software applications. The code of monitored applications is instrumented on the fly, during application run-time, during or after loading class bytecode.

The present invention provides generic, rule based instrumentation filters to select methods of the application for instrumentation. The rule based instrumentation filters use inheritance information for method selection.

Said inheritance information is generated during application run-time and dynamically adapted to changes of configuration or bytecode of the monitored application.

The generic filter mechanism enables placement rules that refer to well known, standardized high level component interfaces. The concrete code that implements the functionality of those components is identified and instrumented at run-time.

Capturing of inheritance information and placement of instrumentation code has no impact on class loading order.

An agent is injected into the process of a monitored application during startup. The agent initializes a communication link with an instrumentation server and intercepts class load events. The bytecode of loaded classes is sent to the instrumentation server for instrumentation. Additionally, instrumentation code can be injected to already loaded classes by sending corresponding bytecode to the instrumentation server and replacing original bytecode with instrumented bytecode in the runtime environment.

The instrumentation engine uses meta-data embedded in the received bytecode, like name of the class, direct base class and directly implemented interfaces to incrementally build the inheritance repository that mirrors the inheritance structure of the monitored application. The inheritance repository reveals also indirect class relationships like inheritance relations that span multiple levels.

After the inheritance repository is updated with the meta-data of the received bytecode, the instrumentation engine uses the inheritance repository to evaluate instrumentation filter rules to filter methods for instrumentation.

The instrumentation engine adds instrumentation code to the code of the filtered methods and sends the altered bytecode back to the agent.

The agent forwards the received bytecode to the run-time system which loads the altered bytecode into memory.

The present invention enables the instrumentation of generic component interfaces by dynamically selecting concrete implementers of the generic component interfaces for the instrumentation at runtime, the instrumentation of interfaces including selecting the classes that implement the methods to instrument by specifying direct or indirect implemented interfaces and a instrumentation of abstract methods including selecting classes that implement methods to instrument by specifying the direct or indirect base class.

The present invention uses object oriented inheritance information to select the methods for instrumentation including creating inheritance repository that maps the global inheritance structure of a monitored application including extracting meta-information identifying direct base class from java or .net class bytecode, storing direct inheritance relationship in a repository, extracting meta-information identifying direct implemented interfaces from java or .net class bytecode, storing the direct interface implementation relationship in a repository and incrementally combining the direct inheritance relationships to map the indirect inheritance relationships of the classes and the interfaces.

Additionally, the present invention evaluates the instrumentation rules, using the global inheritance information at class load time to filter methods to instrument, including using the global inheritance information of the class that implements the method, using the global inheritance information of type of one or more method arguments, using the global inheritance information of a type of method return value and using a combination of the above.

The instrumentation rule matches classes directly or indirectly extending a specific class, and the instrumentation rule matches methods implementing an interface contract of a specific the directly or indirectly implement interface. The instrumentation rule matching is directly or indirectly inherited but not redefined methods.

The present invention adapts object oriented inheritance information according to the changes of monitored application, adapts the inheritance information to load time changed inheritance relationships (AOP load time weaving) including inserting or removing from a base class from the inheritance hierarchy of a class, inserting or removing a base interface from the inheritance hierarchy of an interface and inserting or removing interfaces a class implements, adapts to changes of class definition at load time or during runtime (AOP load time weaving) including inserting or removing methods and changing method signatures.

The present invention adapts the inheritance information to runtime added classes and interfaces including the classes loaded from network sources and including classes dynamically defined at runtime. The present invention reuses the inheritance information between application runs and adapts inheritance information acquired from the previous run to changed inheritance relationships caused by the changed application configuration.

BRIEF DESCRIPTION OF THE DRAWINGS

FIG. 1 illustrates an instrumentation program using instrumentation meta-information and class inheritance-information to evaluate filter rules to determine methods that need to be augmented with instrumentation operations.

FIG. 2 illustrates a system, a preferable embodiment for instrumenting the original bytecode at load-time or during run-time.

FIG. 3 provides a flowchart for the process of initializing or loading an inheritance repository on agent registration.

FIG. 4 depicts an inheritance repository node that may be created for each class or interface received in bytecode format.

FIG. 5 provides a flowchart for the process of building and updating an inheritance repository according to class inheritance information extracted from received bytecode.

FIG. 6a) depicts the state of an exemplary inheritance structure stored within the inheritance repository before a specific class is loaded.

FIG. 6b) shows the state of the exemplary inheritance structure after the specific class is loaded.

FIG. 7a) provides a flowchart describing the process of storing the inheritance repository of a disconnecting agent.

FIG. 7b) shows the process of saving inheritance repositories of connected agents on shutting down the instrumentation server.

FIG. 8 provides a tabular overview of selected instrumentation rule types enabled by the present invention.

DESCRIPTION OF EXEMPLARY EMBODIMENTS

Figure 9A:
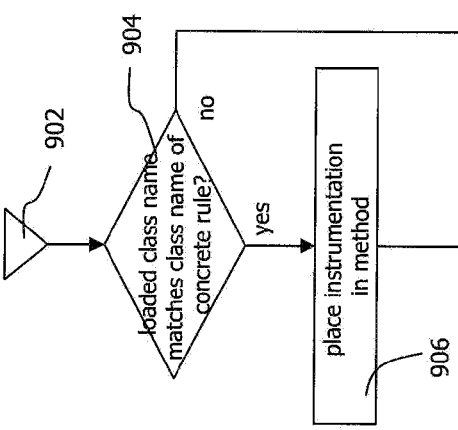
FIG. 9a) shows a flowchart describing the evaluation of concrete instrumentation rules on received class bytecode.

Bytecode based software platforms like Sun Microsystems's Java or Microsoft's .NET framework provide interfaces to intercept bytecode loading events and to alter the bytecode of the loaded class before it is loaded into memory. Additionally those frameworks enable restricted altering of bytecode that is already loaded into the runtime environment.

Open and documented bytecode formats enable analysis of class byte code and selective altering of methods. Meta-data contained in the loaded bytecode enables retrieval of the class name, package or namespace membership, name and signature of implemented methods, direct base class, direct implemented interfaces, etc. The isolated meta-data of a class only reveals direct relationships to other classes, which is not sufficient to provide rule-based adaptive method filtering.

The present invention discloses a method to incrementally aggregate isolated class meta-data into a repository that mirrors also indirect relationships between classes and interfaces. This inheritance repository is in turn used to evaluate method filtering rules to detect methods for instrumentation.

FIG. 1 shows an exemplary method and system for configuring an instrumentation engine 101, using instrumentation meta-information in the form of instrumentation rules 102, instrumentation operations 104 and, run-time generated application meta-information stored in an inheritance repository 103.

Instrumentation rules may either be concrete 812 or generic 814. Parameters of concrete rules include but are not limited to a class name and a method name. Both method and class names may either be concrete names that match to a specific method of a specific class, or name patterns that match a set of methods and/or a set of classes.

Generic rules additionally include a direction indicator 820 that specifies how inheritance relationships should be used for rule evaluation.

Both concrete and generic rules are described in detail in FIG. 8.

The inheritance repository 103 includes run-time created information 112 about class inheritance and interface implementation. The repository is also adapted to changes of inheritance relations during run-time. The process of creation and adaptation of the inheritance repository during run-time is depicted in FIG. 5. The inheritance repository 103 is used to parameterize generic rules which are evaluated during application run-time.

The instrumentation operations 104 define the functionality that is injected into instrumented methods. The instrumentation operations 104 preferably comprise bytecode targeted to the application platform. A separate mapping is maintained that associates instrumentation rules with instrumentation operations to enable rule specific instrumentation.

The instrumentation engine 101 creates and adapts the inheritance repository 103 during runtime, which is used to parameterize instrumentation rules 102. Parameterized instrumentation rules 102 identify the methods where instrumentations should be placed. The instrumentation operations 104 what instrumentation code is placed.

FIG. 2 displays a system 200 including an exemplary embodiment of the present invention consisting in a native loader 204, an agent 205, and an instrumentation server 201 with an instrumentation engine and an inheritance repository. The system also includes an application 207 which is monitored by the embodiment and the runtime environment 206 of the application 207. Agent 205 and native loader 204 are deployed to the application 207. Application 207 and instrumentation server 201 may be separated to different hosts and use a network connection for communication and to exchange bytecode, or they may run on the same host, using inter-process communication to exchange messages and bytecode. Another embodiment may run the instrumentation server 201 within the process of the application 207.

An agent 205 is injected into the process of the application during the application start and establishes a communication link to the instrumentation server 201. The instrumentation server 201 can handle multiple connected agents simultaneously. Instrumenting a software application 207 at load time comprises the following steps: intercepting the native class loader 204 using an agent 205; capturing the original bytecode 202 and transferring said original bytecode 202 to an instrumentation engine 101; updating the inheritance repository 103 shown in FIG. 1 with meta-data extracted from original bytecode 202; evaluating instrumentation rules 102 by using the inheritance repository 103 to filter methods, and instrumenting bytecode of filtered methods; returning the instrumented bytecode 203 to the agent 205, which in turn forwards the instrumented bytecode 203 to the application run-time module 206 instead of the original bytecode 202.

Alternatively, a software application can be instrumented at run-time which allows altering the set of deployed instrumentations during run-time, without the need for an application restart. Instrumenting a software application 207 at run-time comprises the following steps: original bytecode 202 is fetched either by the agent 205 from the application run-time module 206, or retrieved from a bytecode cache of the instrumentation server 201; in case of bytecode fetched from the application run-time, the inheritance repository 103 is updated with meta-data extracted from original bytecode 202; evaluating instrumentation rules 102 and instrument original bytecode 202; returning instrumented bytecode 203 to the agent 205, which replaces the original bytecode 202 of the application run-time module 206 by the instrumented bytecode 203.

Referring to FIG. 3, in step 306 a new inheritance repository 103 is created, initialized and assigned to an agent 205 that registers at instrumentation server 101 for the first time. In step 304, a determination is made to find if an existing inheritance repository is available. For subsequent registrations, the inheritance repository 103 assigned to the agent is loaded step 308. After the inheritance repository 103 for the agent 205 is loaded, the agent establishes a connection to the instrumentation engine 101 in step 310.

FIG. 4 depicts the preferred embodiment of an inheritance repository node (IRN) 401, which is used to represent classes or interfaces within the inheritance repository. It includes meta-information representing a class or interface received from the agent 205, and references to other IRNs 401 which map inheritance or interface implementation relationships. An IRN 401 includes the class name 402 of the represented class or interface, a flag indicating if the IRN describes an interface or a class 403, and a list of declared methods 404 containing method related meta-information like method name and signature.

The field super class 405 references to the IRN 401 representing the direct super class or super interface of the described class or interface and the field implemented interfaces 406 is a list of references to IRNs representing interfaces directly implemented by the class described by the IRN. Classes that directly extend the described class are identified by the field inheriting classes 407, which is a list of references to IRNs representing the classes directly extending the described class.

IRNs and references between IRNs build a graph that enables queries for direct and indirect inheritance and interface implementation relations between classes.

FIG. 5 illustrates the process of building and updating the inheritance repository 103 according to meta-information extracted from original bytecode 202 received from the agent 205.

In a first step 502, meta-information like class or interface name, direct super class name and names of directly implemented interfaces are extracted from the received original bytecode 202. The extracted class or interface name is used to query the inheritance repository 103 for an existing IRN 401 that represents the received class. In step 504, it is determined if the inheritance repository already contains an IRN representing the received original bytecode. If a matching IRN is found, the meta-information of the IRN 401 is updated with the meta-information extracted from received original bytecode 202 in step 506. Otherwise, a new IRN 401 is initialized with meta-information from original bytecode 202 and added to the inheritance repository 103 in step 508.

The inheritance repository is queried in step 510 for IRNs representing the direct super class and the directly implemented interfaces extracted from original bytecode 202, and new IRNs are created in step 512 for classes and interfaces that are not represented within the inheritance repository 103. Those IRNs are partially initialized in step 512 by setting the class name 402 and the interface flag 403 with the meta-information extracted from original bytecode 202. The remaining part of the IRNs created in step 512 is initialized when bytecode of the represented classes is loaded and processed by the instrumentation engine 101. Further, the IRN 401 representing the super class of the received class or interface is updated in step 514 by adding a reference to the IRN representing the received original bytecode 202 to the list of inheriting classes 407.

In a subsequent part of step 514, the fields super class 405, and implemented interfaces 406 of the IRN 401 representing the received original bytecode 202 are initialized with references to the IRNs representing the direct super class and the directly implemented interfaces of the class represented by the received original bytecode 202.

The process depicted in FIG. 5 incrementally builds a graph that maps global inheritance and interface implementation relationships of all classes and interfaces received from the agent 205.

FIG. 6 exemplary illustrates the process of updating an inheritance repository 103. FIG. 6a) shows the state of the inheritance repository before inserting meta-data extracted from received original bytecode of class A. FIG. 6b) shows the state of the inheritance repository after the IRN representing class A was added to the repository. Prior to inserting meta-information of class A, the inheritance repository contains separated IRN 401 graphs, describing parts of the inheritance structure. One sub graph 620 maps inheritance relationship from class F 607 to class E 605 and class D 606, and the interface implementation relationship from class D 606 to interface I 608. Another graph 622 maps the inheritance relationship between the interfaces K 610 and J 609. A third graph 624 contains IRNs for the classes B 603 and C 604 and a preliminary IRN of class A 601. The preliminary IRN of class A 601 contains meta-information concerning class A that was extracted from original bytecode 202 of classes B 603 and C 604, indicating a common super class A 601.

On receiving original bytecode 202 representing class A, the preliminary IRN of class A 601 is updated with extracted meta-information to the final IRN of class A 602. Meta-information extracted from original bytecode 202 representing class A 602 reveals an inheritance relationship between class D 606 and class A 602 and an interface implementation relationship between class A 602 and interface J 609. The inheritance repository 103 is updated to map these additional identified relationships, which fills the gap within the inheritance repository 103 and connects the separated graphs.

The graph depicted in FIG. 6b) shows direct and indirect inheritance relationships and interface implementation relationships of class A 602. For instance, class A 602 directly inherits from class D 606 because both classes are directly connected in the inheritance graph, and it indirectly inherits from class F 607 because class A 602 and class F 607 are indirectly connected via class D 606. Additionally direct and indirect interface relationships of Class A 602 are shown. As an example class A 602 directly implements interface J 609, because the class is directly connected to the interface. Said class A 602 indirectly implements interface K 610 because interface K 610 and class A 602 are indirectly connected via interface J 609.

FIG. 7 describes storage of inheritance repositories 103 by a preferred embodiment using a separate instrumentation server 201 handling multiple agent connections. As depicted in FIG. 7a), the inheritance repository 103 associated with a specific agent 205 is stored in step 702 if the agent is disconnected in step 704. As depicted in FIG. 7b), inheritance repositories 103 of all connected agents are stored in step 706 on shutdown in step 708 of the instrumentation server 201. The stored inheritance repositories are used on subsequent agent connections (cf. FIG. 3).

The preferred embodiment evaluates instrumentation rules 102 against the name of the class or interface and the method names extracted from received original bytecode 202, to filter methods for instrumentation. Instrumentation rules are grouped into concrete and generic rules. Referring now to FIG. 8, concrete instrumentation rules 812 provide filter criteria 810 for class name and a method name which are matched against class name and method names extracted from original bytecode 202. Both class and method filter criteria 810 may be search patterns that match to multiple extracted class or method names. Additional filter criteria 810, like method arguments and method modifiers may also be used for filtering.

Generic rules 814 additionally take inheritance relationships into account. The class name filter criterion is used to query the inheritance repository 103 for classes or interfaces with specific inheritance relationships. Generic instrumentation rules 814 enable instrumentation of method declarations without executable code, like methods declared in interfaces or abstract methods. The classes implementing those methods are determined and instrumented at run-time.

The preferred embodiment provides two different types of generic rules 814, called downward rules 816 and upward rules 818. Generic rules 814 contain a direction indicator 820 which specifies the usage of inheritance information of a specific generic rule. Downward rules 816 are scanning for classes that directly or indirectly inherit from classes, or directly or indirectly implement interfaces matching the class filter criterion. Upward rules are scanning for classes and interfaces that are direct or indirect super classes of the classes matching the class filter criterion.

Downward rules 816 enable instrumentation in an application independent way. For instance, downward rules can be used to instrument any JDBC driver, regardless of the internal implementation of the driver.

Upward rules 818 are used to instrument methods inherited but not overwritten by classes matching the class selection criteria.

The information of the inheritance repository 103 enables various other types of generic instrumentation rules, like rules filtering only methods that implement interfaces, or rules filtering methods called by a specific method.

FIG. 8 exemplary shows the evaluation of concrete, upward, and downward rules. Column 801 shows the filtering of method M1 of class Z using a concrete instrumentation rule with a class filter criterion "Z" and method filter criterion "M1" or "*", a wildcard matching any method name and thus selecting any method of class Z. Generic downward filtering rules are demonstrated in column 802. Class Z implements interface A, which declares M1. In turn, class Z implements method M1 to fulfill the contract of interface A. A downward rule 816 specified for interface A, selecting declared method M1 or all declared methods implicitly filters M1 of Z by evaluating the interface implementation relationship between Z and A. Additionally, class Z extends class B and overwrites the method M2 declared by class B. A downward rule specified for class B, selecting method M2, or a downward rule selecting all methods of class B implicitly filters method M2 of class Z by evaluating the inheritance relationship between class Z and B.

Column 803 illustrates the evaluation of a generic upward rule. Class X extends class Z, and is not overwriting method M1. An upward rule 818 defined for the method M1 or all methods of class X selects method M1 of class Z by searching the nearest super class of X implementing the method M1.

Referring to FIG. 9, instrumenting received original bytecode 202 during load-time or run-time is performed by evaluating instrumentation rules to filter methods for instrumentation.

FIG. 9a) depicts the evaluation of concrete instrumentation rules. Meta-information previously extracted from original byte code 205, like class name and method names is used by the instrumentation engine 101 to evaluate instrumentation rules 103. To determine if a method is selected by one or more concrete instrumentation rules the instrumentation engine 101 first selects in step 902 all concrete instrumentation rules matching the extracted method name. In a second step 904, the extracted class name is matched with the class selection criterion of the instrumentation rules selected in the previous step. Instrumentation operations 104 associated with concrete instrumentation rules that passed both matching steps are inserted in step 906 into the received original bytecode 202.

Figure 9B:
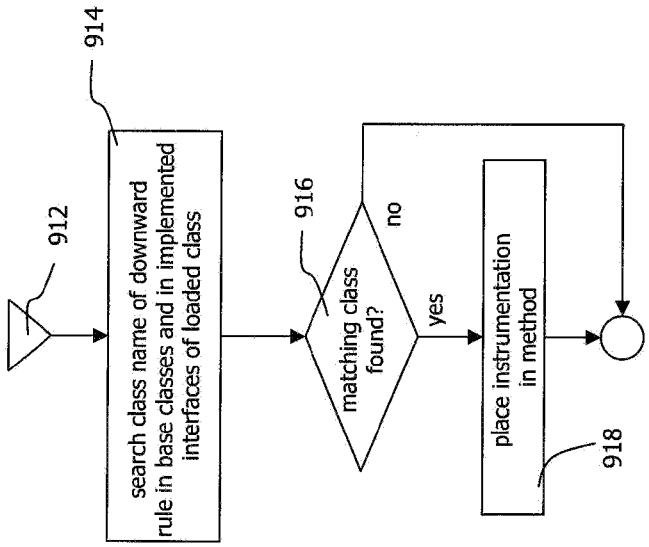
FIG. 9b) illustrates the process of evaluating generic downward rules on received class bytecode.

The process of evaluating downward rules for a method name extracted from received original bytecode 202 is shown in FIG. 9b). First, all downward rules matching the extracted method name are selected in step 912. Then, the inheritance repository 103 is queried in step 914 to determine if the class selection criterion of the selected rules match to the name of a direct or indirect super class or a directly or indirectly implemented interface of the class represented by the received original bytecode 202. If matching classes are found in step 916, downward rules with matching class names are selected, and instrumentation operations 104 associated with those rules are inserted into the received original bytecode 202 in step 918.

Figure 9C:
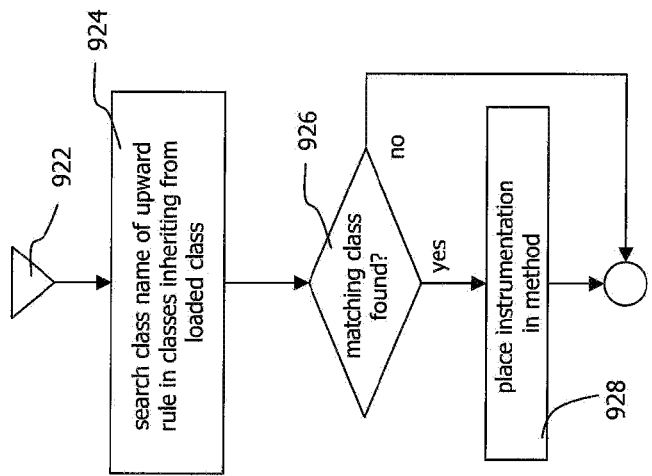
FIG. 9c) provides a flowchart describing the evaluation of generic upward rules on received class byte code.

FIG. 9c) shows the process of evaluating upward rules on a method name extracted from received original bytecode 202. After selecting all upward rules matching the extracted method name in step 922, the inheritance repository 103 is queried for the classes inheriting from the class represented by the received bytecode that match the class selection criterion of the selected rules in step 924. If matching classes are found in step 926, upward rules with class names that match one of the inheriting class names are selected and instrumentation operations 104 associated with those rules are inserted into received original bytecode 202 in step 928.

The processes described in FIG. 9a) to 9c) are executed for each method name extracted from received original bytecode 202 to generate the instrumented bytecode 203.

The invention claimed is:

1. A computer-implemented method comprising:
    (A) extracting, from original bytecode, class meta-data for a plurality of classes;
    (B) generating, based on the extracted meta-data, an inheritance repository representing relationships among the plurality of classes, the relationships including at least one relationship between a first class and a second class, wherein the first class is a direct super class of a third class, and wherein the third class is a direct super class of the second class;
    (C) using the inheritance repository to evaluate at least one instrumentation rule on the plurality of classes, thereby identifying a subset of the plurality of classes;
    (D) instrumenting original bytecode containing the subset of the plurality of classes to produce instrumented bytecode;
    (E) using the inheritance repository to evaluate the at least one instrumentation rule on the plurality of classes of the first application during a second run of the first application;
    wherein (A) comprises extracting the class meta-data at load-time and wherein (B) comprises generating the inheritance repository at load-time;
    wherein (A) further comprises extracting, from original bytecode of a first application, class meta-data for a plurality of classes of the first application; and
    wherein (C) comprises using the inheritance repository to evaluate at least one instrumentation rule on the plurality of classes of the first application during a first run of the first application, thereby identifying a subset of the plurality of classes of the first application.

2. The method of claim 1, wherein the relationships among the plurality of classes comprise class inheritance relationships.

3. The method of claim 2, wherein the class meta-data comprises:
    meta-data for the third class, specifying that the first class is a direct super class of the third class;
    meta-data for the second class, specifying that the third class is a direct super class of the second class; and
    wherein (B) comprises generating, within the inheritance repository, a record of an indirect inheritance relationship between the first class and the second class.

4. The method of claim 1, wherein the relationships among the plurality of classes comprise interface implementation relationships.

5. The method of claim 4, wherein the class meta-data comprises:
    meta-data for the third class, specifying that the third class implements an interface;
    meta-data for the second class, specifying that the third class is a direct super class of the second class; and wherein (B) comprises generating, within the inheritance repository, a record specifying that the second class implements the interface.

6. The method of claim 1, wherein the class meta-data comprises:
  meta-data for the third class, specifying that the third class implements a first interface and that the third class is a direct super class of the second class; and
  wherein (B) comprises generating, within the inheritance repository, a record indicating that the second class implements the first interface.

7. The method of claim 1, wherein the at least one instrumentation rule comprises a concrete instrumentation rule specifying a class name descriptor; and
  wherein (C) comprises determining whether the plurality of classes includes a class having a name which matches the specified class name descriptor.

8. The method of claim 1, wherein the at least one instrumentation rule comprises a concrete instrumentation rule specifying a method name descriptor; and
  wherein (C) comprises determining whether the plurality of classes includes a method having a name which matches the specified method name descriptor.

9. The method of claim 1, wherein the at least one instrumentation rule comprises a generic instrumentation rule specifying a class name descriptor and a direction indicator; and
  wherein (C) comprises identifying, within the plurality of classes, the following:
    any class C having a name which matches the specified class name descriptor;
    any class having an inheritance relationship to class C in the direction indicated by the direction indicator.

10. The method of claim 1, wherein the at least one instrumentation rule comprises a generic instrumentation rule specifying an interface name descriptor and a direction indicator; and
  wherein (C) comprises identifying, within the plurality of classes, the following:
    any class C which implements an interface matching the specified interface name descriptor;
    any class C having an inheritance relationship to class C in the direction indicated by the direction indicator.

11. The method of claim 1, further comprising:
  (F) using the inheritance repository to evaluate at least one instrumentation rule on the plurality of classes at run-time, thereby identifying a subset of the plurality of classes; and
  (G) instrumenting original bytecode containing the subset of the plurality of classes at run-time to produce instrumented bytecode.

12. The method of claim 11, wherein the at least one instrumentation rule comprises a generic instrumentation rule specifying a class name descriptor and a direction indicator; and
  wherein (C) comprises identifying, within the plurality of classes, the following:
    any class C having a name which matches the specified class name descriptor;
    any class having an inheritance relationship to class C in the direction indicated by the direction indicator.

13. The method of claim 11, wherein the at least one instrumentation rule comprises a generic instrumentation rule specifying an interface name descriptor and a direction indicator; and
  wherein (C) comprises identifying, within the plurality of classes, the following:
    any class C which implements an interface matching the specified interface name descriptor;
    any class C having an inheritance relationship to class C in the direction indicated by the direction indicator.

14. A non-transitory computer-readable medium tangibly storing computer program instructions executable by a computer processor to perform a method comprising:
  (A) extracting, from original bytecode, class meta-data for a plurality of classes;
  (B) generating, based on the extracted meta-data, an inheritance repository representing relationships among the plurality of classes, the relationships including at least one relationship between a first class and a second class, wherein the first class is a direct super class of a third class, and wherein the third class is a direct super class of the second class;
  (C) using the inheritance repository to evaluate at least one instrumentation rule on the plurality of classes, thereby identifying a subset of the plurality of classes;
  (D) instrumenting original bytecode containing the subset of the plurality of classes to produce instrumented bytecode;
  (E) using the inheritance repository to evaluate the at least one instrumentation rule on the plurality of classes of the first application during a second run of the first application;
  wherein (A) comprises extracting the class meta-data at load-time and wherein (B) comprises generating the inheritance repository at load-time;
  wherein (A) further comprises extracting, from original bytecode of a first application, class meta-data for a plurality of classes of the first application; and
  wherein (C) comprises using the inheritance repository to evaluate at least one instrumentation rule on the plurality of classes of the first application during a first run of the first application, thereby identifying a subset of the plurality of classes of the first application.

15. The computer-readable medium of claim 14, wherein the relationships among the plurality of classes comprise class inheritance relationships.

16. The computer-readable medium of claim 15, wherein the class meta-data comprises:
  meta-data for the third class, specifying that the first class is a direct super class of the third class;
  meta-data for the second class, specifying that the third class is a direct super class of the second class; and
  wherein (B) comprises generating, within the inheritance repository, a record of an indirect inheritance relationship between the first class and the second class.

17. The computer-readable medium of claim 14, wherein the relationships among the plurality of classes comprise interface implementation relationships.

18. The computer-readable medium of claim 17, wherein the class meta-data comprises:
  meta-data for the third class, specifying that the third class implements an interface;
  meta-data for the second class, specifying that the third class is a direct super class of the second class; and
  wherein (B) comprises generating, within the inheritance repository, a record specifying that the second class implements the interface.

19. The computer-readable medium of claim 14, wherein the class meta-data comprises:
  meta-data for the third class, specifying that the third class implements a first interface and that the third class is a direct super class of the second class; and wherein (B) comprises generating, within the inheritance repository, a record indicating that the second class implements the first interface.

20. The computer-readable medium of claim 14, wherein the at least one instrumentation rule comprises a concrete instrumentation rule specifying a method name descriptor; and wherein (C) comprises determining whether the plurality of classes includes a method having a name which matches the specified method name descriptor.

21. The computer-readable medium of claim 14, wherein the at least one instrumentation rule comprises a concrete instrumentation rule specifying a class name descriptor; and wherein (C) comprises determining whether the plurality of classes includes a class having a name which matches the specified class name descriptor.

22. The computer-readable medium of claim 14, wherein the at least one instrumentation rule comprises a generic instrumentation rule specifying a class name descriptor and a direction indicator; and wherein (C) comprises identifying, within the plurality of classes, the following:

any class C having a name which matches the specified class name descriptor;

any class having an inheritance relationship to class C in the direction indicated by the direction indicator.

23. The computer-readable medium of claim 14, wherein the at least one instrumentation rule comprises a generic instrumentation rule specifying an interface name descriptor and a direction indicator; and wherein (C) comprises identifying, within the plurality of classes, the following:

any class C which implements an interface matching the specified interface name descriptor;

any class C having an inheritance relationship to class C in the direction indicated by the direction indicator.

24. The computer-readable medium of claim 14, wherein the method further comprises:

(F) using the inheritance repository to evaluate at least one instrumentation rule on the plurality of classes at run-time, thereby identifying a subset of the plurality of classes; and (G) instrumenting original bytecode containing the subset of the plurality of classes at run-time to produce instrumented bytecode.

25. The computer-readable medium of claim 24, wherein the at least one instrumentation rule comprises a generic instrumentation rule specifying a class name descriptor and a direction indicator; and wherein (C) comprises identifying, within the plurality of classes, the following:

any class C having a name which matches the specified class name descriptor;

any class having an inheritance relationship to class C in the direction indicated by the direction indicator.

26. The computer-readable medium of claim 24, wherein the at least one instrumentation rule comprises a generic instrumentation rule specifying an interface name descriptor and a direction indicator; and wherein (C) comprises identifying, within the plurality of classes, the following:

any class C which implements an interface matching the specified interface name descriptor;

any class C having an inheritance relationship to class C in the direction indicated by the direction indicator.

\* \* \* \* \*

UNITED STATES PATENT AND TRADEMARK OFFICE
CERTIFICATE OF CORRECTION

PATENT NO.         : 8,464,225 B2
APPLICATION NO.    : 11/744876
DATED              : June 11, 2013
INVENTOR(S)        : Bernd Greifeneder It is certified that error appears in the above-identified patent and that said Letters Patent is hereby corrected as shown below:

Title page, in Item (57), under "Abstract", in column 2, lines 1-2, delete "byte code" and insert -- bytecode --, therefor.

In the Specification:
In column 5, line 6, delete "byte code." and insert -- bytecode. --, therefor.
In column 5, line 19, delete "byte code" and insert -- bytecode --, therefor.
In column 8, lines 15-16, delete "relation ships" and insert -- relationships --, therefor.
In column 9, line 41, delete "byte code" and insert -- bytecode --, therefor.

Signed and Sealed this
Nineteenth Day of November, 2013

Teresa Stanek Rea
*Deputy Director of the United States Patent and Trademark Office*